(12) United States Patent
Van Zelm et al.

(10) Patent No.: US 11,549,368 B2
(45) Date of Patent: Jan. 10, 2023

(54) SERIAL HYBRID DOWNHOLE TELEMETRY NETWORKS

(71) Applicant: Baker Hughes Oilfield Operations LLC, Houston, TX (US)

(72) Inventors: John-Peter Van Zelm, Calgary (CA); Andy Hawthorn, Missouri City, TX (US)

(73) Assignee: Baker Hughes Oilfield Operations LLC

( * ) Notice: Subject to any disclaimer, the term of this patent is extended or adjusted under 35 U.S.C. 154(b) by 0 days.

(21) Appl. No.: 16/958,772

(22) PCT Filed: Dec. 19, 2018

(86) PCT No.: PCT/US2018/066448
§ 371 (c)(1),
(2) Date: Jun. 29, 2020

(87) PCT Pub. No.: WO2019/133366
PCT Pub. Date: Jul. 4, 2019

(65) Prior Publication Data
US 2020/0325769 A1 Oct. 15, 2020

Related U.S. Application Data

(60) Provisional application No. 62/611,014, filed on Dec. 28, 2017.

(51) Int. Cl.
*E21B 47/16* (2006.01)
*E21B 47/14* (2006.01)
(Continued)

(52) U.S. Cl.
CPC ............ *E21B 47/16* (2013.01); *E21B 47/135* (2020.05); *E21B 47/18* (2013.01); *H04B 1/005* (2013.01); *H04B 10/255* (2013.01)

(58) Field of Classification Search
None
See application file for complete search history.

(56) References Cited

U.S. PATENT DOCUMENTS 8,731,413 B1 * 5/2014 Dave ................ H04B 10/25137
398/208
9,453,409 B2 9/2016 Xu
(Continued)

FOREIGN PATENT DOCUMENTS

| EP | 2157278 A1 | 2/2010 |
| GB | 2407334 A | 4/2005 |
| WO | WO2004113677 A1 | 12/2004 |

OTHER PUBLICATIONS

Written Opinion of the International Searching Authority in international application PCT/US2018/066448 dated Mar. 26, 2019, 13 pages.

*Primary Examiner* — Curtis A Kuntz
*Assistant Examiner* — Jerold B Murphy
(74) *Attorney, Agent, or Firm* — Jonathan Pierce; Pierre Campanac; Porter Hedges LLP

(57) ABSTRACT

A hybrid telemetry system includes a plurality of telemetry networks configured to communicate a modulated signal representing digital data along adjoining sections of a pipe string. The plurality of telemetry networks may each be optimized or particularly suitable for the configuration of the pipe string, the well, and/or the environment of the well occurring in each of the adjoining sections. Some of the plurality of telemetry networks may overlap to provide redundancy of the communication of the digital data.

10 Claims, 3 Drawing Sheets

(51) Int. Cl.
*E21B 47/12* (2012.01)
*E21B 47/135* (2012.01)
*E21B 47/18* (2012.01)
*H04B 1/00* (2006.01)
*H04B 10/255* (2013.01)

(56) References Cited

U.S. PATENT DOCUMENTS

| | | |
|---|---|---|
| 10,408,047 B2 | 9/2019 | Morrow |
| 2009/0146836 A1* | 6/2009 | Santoso ................. E21B 47/12 340/854.4 |
| 2009/0224936 A1* | 9/2009 | Vannuffelen .......... E21B 47/135 340/854.7 |
| 2010/0328096 A1* | 12/2010 | Hache ..................... E21B 47/12 340/854.4 |
| 2011/0205847 A1* | 8/2011 | Lemenager ............. E21B 47/16 367/82 |
| 2013/0278432 A1* | 10/2013 | Shashoua ................. G01V 3/18 340/853.7 |
| 2014/0169406 A1* | 6/2014 | Hadani ................. H04L 5/0016 375/131 |
| 2015/0077265 A1 | 3/2015 | Gao et al. |
| 2015/0106680 A1* | 4/2015 | Djordjevic .......... H03M 13/255 714/776 |

\* cited by examiner

SERIAL HYBRID DOWNHOLE TELEMETRY NETWORKS

BACKGROUND

This disclosure relates generally to methods and apparatus for communicating digital data along a pipe string that is for use in a well.

Often, that pipe string has sections of variable diameter along its length. For example, the diameter of the pipe string may be locally reduced to accommodate a tool around the pipe string, or otherwise enlarged to accommodate tool joints at the extremities of a pipe body, collars, etc. These variations of diameter may induce multiple reflections of waves that travel in the wall of the pipe string or in the fluid provided in the central bore of the pipe string. As a consequence of these reflections, it may be difficult to communicate digital data along the entire length of the pipe string by using a single telemetry type that relies on wave propagation either in the wall of the pipe string or in the fluid located in the central bore of the pipe string.

Further, the pipe string may have sections that lie on the wall of the well, such as in horizontal or highly deviated portions of the well, sections that are centered in the well, such as in vertical portions of the well, and/or sections that are highly curved. These changes of configuration of the pipe string and/or the well may cause changes in the frequency response of the medium or attenuation of waves that travel in the wall of the pipe string or in the fluid provided in the central bore of the pipe string. As a consequence of these variations, it may be difficult to communicate digital data along a pipe string in a well by using a single telemetry type for every configuration of the pipe string and/or the well.

Also, some portions of the well may be cased, while other portions of the well may be open-hole. Some portions of the material surrounding the well may be electrically conductive (such as in the ocean around a riser), while other portions of the material surrounding the well may not be electrically conductive (such as hydrocarbon-bearing reservoirs). These changes of environment of the well may cause attenuation of electromagnetic waves. Again, as a consequence of these attenuations, it may be difficult to communicate digital data along a pipe string in a well by using a single telemetry type for every environment of the well.

Still further, sources of noise, such as electromagnetic noise, or acoustic noise, are often present at different locations along a pipe string. For example, mud pumps located on a drilling rig may cause acoustic noise near the proximal end of the pipe string. A drill bit or a mud motor may cause another type of acoustic noise near the distal end of the pipe string. The characteristics of the noise generated by these sources (such as frequency and magnitude) usually vary along the well. Yet again, as a consequence of the noise variations, it may be difficult to communicate digital data along a pipe string in a well by using a single telemetry type that relies on the same modulation frequency regardless of the source of noises that may be present.

Finally, mechanical constraints imposed by the wellbore (such as available space) and/or imposed on the pipe string (such required strength) may change along the length of the pipe string. Because of these different mechanical constraints, it may be difficult to communicate digital data along a pipe string by using a single telemetry type. For example, it may be difficult to use only an acoustic telemetry based on clamp-on transceivers, or only an acoustic telemetry based on inline transceivers (incorporated in the wall of a collar).

Thus, there is a continuing need in the art for methods and apparatus for communicating digital data along a pipe string. Preferably, these methods and apparatus involve multiple telemetry networks operating in series to communicate digital data bi-directionally between downhole locations and the surface. Each telemetry network may be optimized or particularly suitable for communicating digital data along each of multiple sections of the pipe string or each of multiple portions of the well.

SUMMARY

The disclosure describes a method of communicating digital data along a pipe string for use in a well. The pipe string may include a first section, a second section adjoining the first section. For example, the first section of the pipe string may be a distal section of the pipe string. The first section of the pipe string may be located in a horizontal or deviated portion of the well. The first section of the pipe string may be located in an open-hole portion of the well. The second section of the pipe string may be a proximal section of the pipe string. The second section of the pipe string may be located in a vertical portion of the well extending to a drilling rig. The second section of the pipe string may be located in a cased portion of the well that is extending to a drilling rig. Optionally, the first section is an intermediate section, and the pipe string may further include a third section, also adjoining the first section.

The method of communicating digital data may comprise providing a first transmitter and in the first section of the pipe string. The method may further comprise providing a first receiver in the pipe string.

The method of communicating digital data may comprise providing a second transmitter located in the second of the pipe string. The second transmitter may be in communication with the first receiver.

The method of communicating digital data may comprise providing an interface apparatus in communication with the first receiver and the second transmitter. For example, the interface apparatus, the first receiver, and the second transmitter may be collocated in a single tool.

The method of communicating digital data may comprise emitting, with the first transmitter, a first modulated signal encoding the digital data. For example, the first modulated signal may be a mud-pulse telemetry signal traveling in a fluid located in a bore of the pipe string. The first modulated signal may be an electromagnetic signal traveling in a formation surrounding the well. The first modulated signal may be an optical signal traveling in an optic fiber disposed along the pipe string. The first modulated signal may be an acoustic signal traveling in a wall of the pipe string.

The method of communicating digital data may comprise transmitting the first modulated signal along the first section of the pipe string.

The method of communicating digital data may comprise sensing, with the first receiver, the first modulated signal.

The method of communicating digital data may comprise decoding, with the interface apparatus, the first modulated signal to generate the digital data. Alternatively, the first modulated signal may not be decoding into the digital data.

The method of communicating digital data may comprise emitting, with the second transmitter, a second modulated signal encoding at least a portion of the digital data. For example, the second modulated signal may be a mud-pulse telemetry signal traveling in a fluid located in a bore of the pipe string. The second modulated signal may be an electromagnetic signal traveling in a formation surrounding the well. The second modulated signal may be an optical signal traveling in an optic fiber disposed along the pipe string. The second modulated signal may be an acoustic signal traveling in a wall of the pipe string.

In some embodiments, the first modulated signal may be a first acoustic signal traveling in a wall of the first section of the pipe string. The second modulated signal may be a second acoustic signal traveling in a wall of the second section of the pipe string. The first configuration of the first modulated signal may differ from a second configuration of the second modulated signal. Modulated signal configuration may pertain to a specification for one or more of the modulated signal attributes consisting of frequency bandwidth, center frequency, number and frequency of carriers, a modulation type and configuration, error correction coding, and transmission power level.

In some embodiments, the first modulated signal may not be an acoustic signal traveling in a wall of the first section of the pipe string. The second modulated signal may be a second acoustic signal traveling in a wall of the second section of the pipe string.

In some embodiments, either the first modulated signal is an optical signal, the first modulated signal is transmitted in an optic fiber disposed along the first section of the pipe string, and the second modulated signal is not an optical signal, or the first modulated signal is an not an optical signal, the second modulated signal is an optical signal, and the second modulated signal is transmitted in an optic fiber disposed along the second section of the pipe string.

In some embodiments, the first transmitter may be one of a clamp-on transmitter attached to a portion of the pipe string, an inline transmitter forming a portion of the pipe string, and a carrier-based transmitter incorporated into a receptacle in the wall of a collar forming a portion of the pipe string.

In some embodiments, the second transmitter may be one of a clamp-on transmitter attached to a portion of the pipe string, an inline transmitter forming a portion of the pipe string, and a carrier-based transmitter incorporated into a receptacle in the wall of a collar forming a portion of the pipe string.

In some embodiments, the method of communicating digital data may comprise measuring a first passband of the first acoustic signal. A first modulation frequency of the first modulated signal may be determined based on the first passband.

In some embodiments, the method of communicating digital data may comprise measuring a noise spectrum of a noise signal sensed with the second receiver when the second transmitter is not emitting. The method may further comprise measuring a passband spectrum of a signal traveling between the second transmitter and the second receiver. The second configuration may be determined based on the noise spectrum and the passband spectrum.

In some embodiments, a second modulation frequency of the second modulated signal may be higher than a first modulation frequency of the first modulated signal, and the data rate of the first modulated signal may be approximately equal to the data rate of the second modulated signal.

In some embodiments, a second modulation frequency of the second modulated signal may be lower than a first modulation frequency of the first modulated signal, and the data rate of the first modulated signal may be approximately equal to the data rate of the second modulated signal.

In some embodiments, a second frequency bandwidth of the second modulated signal may be larger than a first frequency bandwidth of the first modulated signal.

In some embodiments, a second frequency bandwidth of the second modulated signal may be smaller than a first frequency bandwidth of the first modulated signal.

In some embodiments, the method of communicating digital data may comprise providing a second receiver in the second and/or third section of the pipe string. The second receiver may be in communication with the first transmitter. The method may further comprise sensing, with the second receiver, a third modulated signal encoding the digital data. For example, the third modulated signal may be a mud-pulse telemetry signal traveling in a fluid located in a bore of the pipe string. The third modulated signal may be an electromagnetic signal traveling in a formation surrounding the well. The third modulated signal may be an optical signal traveling in an optic fiber disposed along the pipe string. The third modulated signal may be an acoustic signal traveling in a wall of the pipe string. The first modulated signal that is emitted with the first transmitter may be determined from the third modulated signal. The method may comprise decoding, with the interface apparatus, the third modulated signal to generate the digital data. Alternatively, the third modulated signal may not be decoding into the digital data.

In some embodiments, the method of communicating digital data may comprise communicating digital data bi-directionally between the first section and the second section. For example, communicating digital data bi-directionally between the first section and the second section may be performed using the first receiver, the second transmitter, and the interface apparatus. Alternatively, additional (e.g., third, fourth) transmitter(s) and receiver(s) may be provided in the pipe string. The interface apparatus may also be in communication with some of the additional transmitter(s) and receiver(s).

BRIEF DESCRIPTION OF THE DRAWINGS

For a more detailed description of the embodiments of the disclosure, reference will now be made to the accompanying drawings, wherein.

DETAILED DESCRIPTION

Figure 1:
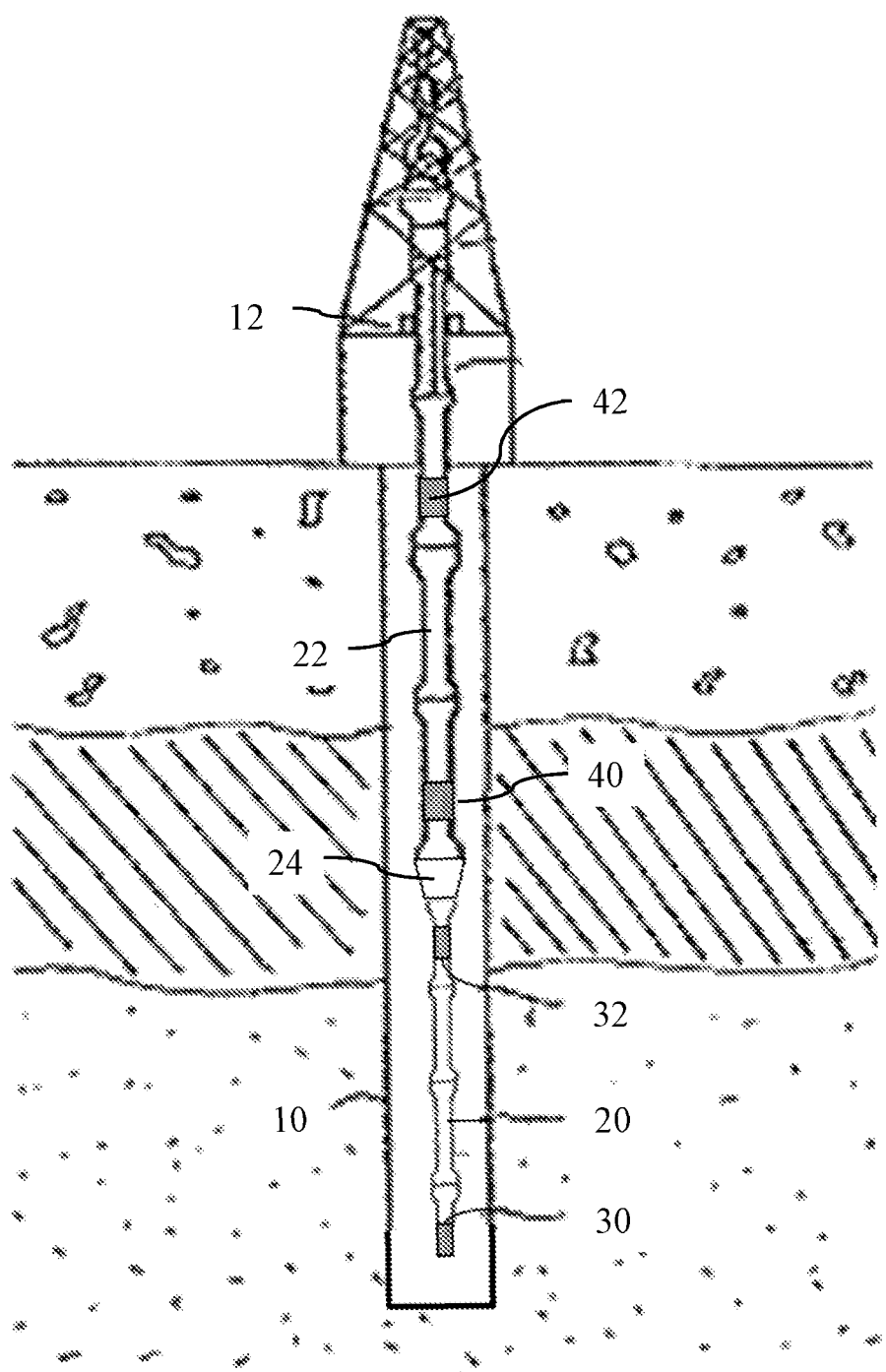
FIG. 1 is a schematic of a telemetry system including a first telemetry network provided in a first section of the pipe string having a small diameter and a second telemetry network provided in a second section of the pipe string having a large diameter, wherein the modulation bandwidth, the modulation center frequency, the number and frequency of carrier signals, the modulation type and configuration, the transmission power level, and/or the error correction coding of the telemetry signal is changed between the first telemetry network and the second telemetry network.

As one skilled in the art will appreciate, various entities may refer to pipe-string vibrations by different names. These pipe-string vibrations may be commonly referred to as sonic signals, acoustic signals, sound(s), etc. "Acoustic signal(s)" is used throughout the following description and claims. However, the naming convention is not intended to limit the scope of the invention, unless otherwise specifically defined herein. Further, as used herein, acoustic signals generally include any mode of waves propagating in a pipe string, including extensional waves, transverse or bending waves, shear waves, torsional waves, among other modes of waves.

The disclosure describes telemetry systems that include a plurality of telemetry networks configured to communicate a modulated signal representing digital data along adjoining sections of a pipe string. As used herein, adjoining sections of pipe string include adjacent sections that end nearby without touching each other, contiguous sections that share a common boundary, and slightly overlapping sections. Two or more of the plurality of telemetry networks that are provided in two or more adjoining sections of the pipe string may each be optimized or particularly suitable for the configuration of the pipe string, the well, and/or the environment of the well occurring in each of the two or more adjoining sections. Optionally, some of the plurality of telemetry networks may entirely overlap and provide redundancy of the communication of the digital data along the common section of the pipe string.

Each of the two or more telemetry networks may rely on the propagation of a signal in the same medium, but the two or more telemetry networks may be operated at different modulation frequencies, different error correction coding, and/or different modulation types and configurations, therefore providing different signal frequency bandwidths and/or different levels of robustness. Preferably, but not necessarily, the data rates are essentially equal in the telemetry networks. Additionally, the power, the configuration of the transducers of the two or more telemetry networks may differ. In some embodiments, the two or more telemetry networks may rely on the propagation of an acoustic signal traveling in a wall of the pipe string. A first one of the two or more telemetry networks may include clamped-on type transducers, and a second one of the two or more telemetry networks may include inline type transducers.

Alternatively, each of the two or more telemetry networks may rely on the propagation of a signal in a different medium. In some embodiments, a first one of the two or more telemetry networks may rely on propagation of an acoustic signal traveling in a wall of the pipe string (sometimes referred to herein as an acoustic telemetry network), and a second one of the two or more telemetry networks may rely on propagation of a pressure signal traveling in a fluid located in a bore of the pipe string (sometimes referred to herein as a mud-pulse telemetry network). In other embodiments, the second one of the two or more telemetry networks may rely on the propagation of a light signal traveling through one or more optic fiber provided along the pipe string (sometimes referred to herein as an optical telemetry network). In yet other embodiments, the second one of the two or more telemetry networks may rely on the propagation of an electromagnetic signal traveling in a formation surrounding the well (sometimes referred to herein as an electromagnetic telemetry network).

Optionally, an optical telemetry networks may be communicatively coupled to a non-optical telemetry network. The coupling may be performed without decoding or encoding any modulated signal into digital data.

Referring to FIG. 1, a pipe string (20, 22) is shown in use in a well 10. The pipe string (20, 22) includes a first section 20 and a second section 22 adjoining the first section 20. For example, the first section 20 and/or the second section 22 may include one or more pipe joints. In the example embodiment of FIG. 1, the first section 20 of the pipe string comprises a section having a first diameter and the second section 22 of the pipe string comprises a section having a second diameter, the second diameter being strictly larger than the first diameter. However, the first section 20 and the second section 22 of the pipe string may differ by one or more characteristics other than the diameter. Such characteristics include, but are not limited to, the average length of the pipe joints, the weight of the pipe joints, the thickness of the pipe string, the type of connections between pipe joints, and/or the base geometry of the pipe string (e.g., casing string, or drillpipe string, or washpipe string). While only one first section and one second section are shown in the pipe string (20, 22), the pipe string (20, 22) may include more than two adjoining sections.

Different pipe types—e.g., washpipe to drill pipe, and/or different environments may require different modulated signal configurations. By way of example, washpipe (or drill collars) does not have heavy tool joints and so has no frequency passbands (or, in other words, washpipe has a wide bandwidth). Drillpipe has heavy tool joints which give rise to passbands. Telemetry networks operating in the different pipe types may thus benefit from different operating frequencies, number of carrier signals or signal bandwidths. In another example, washpipe (or coiled tubing) is thin-walled, so has higher attenuation. Drillpipe may have lower attenuation. Telemetry networks operating in washpipe may thus benefit from encoding with higher error correction or transmission power level than telemetry networks operating in drillpipe. More generally, the signal configuration of each network may be tailored to the type of pipe and/or the environment in which each network operates. Accordingly, the signal configuration is modified between the telemetry networks forming the telemetry system, in order to suit the type of pipe and/or the environment.

Specifically, the signal configuration may consist of one or more of the following characteristics: signal bandwidth, signal operating frequency (center frequency), number and frequency of carrier signals, modulation type (PSK, FSK, ASK, OFDM, etc) and configuration (baud rate, pulse shape, etc), protocols (pilots, preambles, etc), error correction coding, and transmission power level.

Preferably, data rates along a telemetry system formed by a plurality of different telemetry networks are kept nearly equal between the networks. As such, data rate bottlenecks may be avoided. To do so, encoding overhead may be compensated with large bandwidth signals, and constrained bandwidth may be compensated with a low error correction.

A first telemetry network is provided in the first section 20 of the pipe string. The first telemetry network comprises at least one first transmitter 30 and at least one first receiver 32. While only one first transmitter 30 and one first receiver 32 are shown in the first telemetry network, the first telemetry network may include a plurality of transmitters and receivers, sometimes combined into repeaters. The first transmitter 30 is capable of emitting a first modulated signal encoding digital data. In the example embodiment of FIG. 1, the first modulated signal is a first acoustic signal traveling in a wall of the first section 20 of the pipe string. The first modulated signal has at least a first modulation frequency and a first modulation type and configuration. Optionally, the first modulated signal may be generated by frequency-division multiplexing, and thus may have several modulation frequencies and/or modulation types and configurations. As such, the first modulated signal has a first frequency bandwidth. The first receiver 32 is capable of sensing the first modulated signal. For example, the first transmitter 30 and/or the first receiver 32 may be of a clamp-on type, such as disclosed in U.S. Patent Application Pub. No. 2015/0077265.

A second telemetry network is provided in the second section 22 of the pipe string. The second telemetry network comprises at least one second transmitter 40 and at least one second receiver 42. Again, while only one second transmitter 40 and one second receiver 42 are shown in the second telemetry network, the second telemetry network may include a plurality of transmitters and receivers, sometimes combined into repeaters, and referred to as nodes. The second transmitter 40 is capable of emitting a second modulated signal encoding digital data. In the example embodiment of FIG. 1, the second modulated signal is a second acoustic signal traveling in a wall of the second section 22 of the pipe string. The second modulated signal has at least a second modulation frequency and a second modulation type and configuration. Optionally, the second modulated signal may be generated by frequency-division multiplexing, and thus may have several modulation frequencies and/or modulation types and configurations. As such, the second modulated signal has a second frequency bandwidth. The second receiver 42 is capable of sensing the second modulated signal. For example, the second transmitter 40 and/or the second receiver 42 may be of an inline type, such as disclosed in Canadian Patent Application Pub. No. 2,585,046.

In the embodiment shown in FIG. 1, the first transmitter 30 and/or the first receiver 32 may be of a clamp-on type and the second transmitter 40 and/or the second receiver 42 may be of an inline type. Alternatively, the first transmitter 30, the first receiver 32, the second transmitter 40, and the second receiver 42 may all be of a clamp-on type. Further, the first transmitter 30, the first receiver 32, the second transmitter 40, and the second receiver 42 may all be of a clamp-on type may all be of an inline type. Other combinations are also possible.

An interface apparatus 24 is in communication with the first receiver 32 and the second transmitter 40. The interface apparatus 24 includes electronics programmed to translate a first modulated signal into a second modulated signal that has a different modulated signal configuration. The interface apparatus 24 may optionally, but not necessarily, be housed in an interface tool that forms a distinct part of the pipe string. Also, the interface apparatus 24, the first receiver 32, and the second transmitter 40 may optionally, but not necessarily, be collocated in the interface tool. The interface apparatus 24 is capable of decoding the first modulated signal sensed by the first receiver 32 to generate the digital data encoded in the first modulated signal. The interface apparatus 24 is also capable of encoding at least a portion of the digital data previously generated into the second modulated signal emitted by the second transmitter 40. Optionally, the interface apparatus 24 is capable of encoding both the digital data previously generated and measurements of one or more downhole sensors that are not encoded in the first modulated signal. The one or more downhole sensors may be provided in the interface apparatus 24, and may measure, for example, a pressure of a fluid located in the well 10 or in a bore of the pipe string (20, 22), a temperature of the fluid located in the well 10 or in the bore of the pipe string (20, 22), an acceleration of the interface apparatus 24, and/or a deformation of the interface apparatus 24, among other measurements.

In the embodiment shown in FIG. 1, the second modulation frequency used in the second telemetry network differs from the first modulation frequency used in the first telemetry network. Alternatively or additionally, the second modulation type and configuration may differ from the first modulation type and configuration. Consequently, the second frequency bandwidth usually differs from the first frequency bandwidth.

The first telemetry network, the second telemetry network and the interface apparatus 24 illustrated in FIG. 1 form a telemetry system for communicating digital data along the pipe string (20, 22), wherein the modulation frequency of the first telemetry network may be optimized or made more suitable for the configuration of the first section 20 of pipe string (20, 22), the geometry of the well 10 located near the first section 20 of pipe string (20, 22), and/or the environment of the well 10 located near the first section 20 of pipe string (20, 22). Independently from the modulation frequency of the first telemetry network, the modulation frequency of the second telemetry network may also be optimized or made more suitable for the configuration of the second section 22 of pipe string (20, 22), the geometry of the well 10 located near the second section 22 of pipe string (20, 22), and/or the environment of the well 10 located near the second section 22 of pipe string (20, 22). Thus, a first modulation frequency of the first modulated signal may differ from a second modulation frequency of the second modulated signal.

More generally, any node, including the first transmitter 30, the first receiver 32, the second transmitter 40, and the second receiver 42, may be adapted to some characteristics of the pipe string on which it is implemented. For example, the mechanical design of any node and/or the mechanical design of the coupling to the pipe string of any node may be adapted to the geometry of the pipe string and/or a mode of wave suitable propagating in the pipe string.

Further, the characteristics of the signal transmitted by any node, including the first transmitter 30, the first receiver 32, the second transmitter 40, and the second receiver 42, may be adapted to the propagation characteristics of the pipe string on which it is implemented, for example, the passband of the pipe string. Additionally, the characteristics of the signal transmitted by any node may be adapted to the environmental characteristics where it is implemented, for example, the spectrum of the noise generated in the environment.

In the embodiment shown in FIG. 1, the second modulation frequency may be selected higher than the first modulation frequency so that the data rate of the second telemetry network is higher than the data rate of the first telemetry network, and accordingly, the second modulated signal can encode the digital data decoded from the first modulated signal as well as the measurements of the one or more downhole sensors that were not encoded in the first modulated signal. Note that a higher modulation frequency does not necessarily lead to higher data rates. Indeed, data rates are driven by frequency bandwidth in addition to the modulation frequency. Thus, a similar increase of data rate may be achieved by selecting the second frequency bandwidth that is larger than the first frequency bandwidth. Note also that a higher data rate is not required for the second telemetry network to additionally encode along-string measurements that were not encoded in the first modulated signal. Indeed, these along-string measurements can be added to the signal without increasing the data rate, thus lengthening the duration of the transmission.

Still in the embodiment shown in FIG. 1, the first modulation frequency may alternatively or additionally be optimized or made more suitable for an acoustic signal traveling in the wall pipes having the first diameter, while the second modulation frequency may be optimized or made more suitable for an acoustic signal traveling in the wall pipes having the second diameter, which is strictly larger than the first diameter. Accordingly, the first modulation frequency and the second modulation frequency may be determined based on a first passband of the first acoustic signal, and a second passband of the second acoustic signal.

Yet still in the embodiment of FIG. 1, mud pumps located on the drilling rig 12 may generate noise. Accordingly, a noise spectrum of the mud pump noise sensed with the second receiver 42 may be measured when the second transmitter 40 is not emitting. A passband spectrum of a two or more adjoining sections signal traveling between the second transmitter 40 and the second receiver 42 may be measured when the mud pumps are off. The second modulation frequency may be determined based on the noise spectrum and the passband spectrum so that a suitable signal to noise ratio is attained.

Further, the first modulation frequency may be optimized or made more suitable for acoustic signal emitted and/or sensed with transmitters and/or the receivers of a clamp-on type, while the second modulation frequency may be optimized or made more suitable for acoustic signal emitted and/or sensed with transmitters and/or the receivers of an inline type.

The telemetry system formed with the first telemetry network, the second telemetry network and the interface apparatus 24 illustrated in FIG. 1 may further be optimized, so that the transmitter-receiver spacing in each of the first section 20 and the second section 22 are independently adapted to the power and/or the type of the transmitters and receivers provided in each section. The type of modulation of the first modulated signal and the second modulated signal is preferably a modulation of phase; however, the type of modulation of the first modulated signal and the second modulated may differ from phase modulation and may differ between the first modulated signal and the second modulated signal. The type of encoding of a digital signal into the first modulated signal and the second modulated signal may also differ between the first modulated signal and the second modulated signal. Also, the data compression scheme, and/or the error detection and correction scheme may also differ between the first modulated signal and the second modulated signal.

In other embodiments, the mechanical designs of the nodes and the mechanical designs of their coupling to the pipe string may be identical along the pipe string. Also, the nodes located along the pipe string may be capable of transmitting signals having the same characteristics. The nodes located along the pipe string may be capable of transmitting signals at a first modulation frequency as well as at a second modulation frequency that differs from the first modulation frequency. Alternatively or additionally, the nodes located along the pipe string may be capable of transmitting signals using a first modulation type and configuration as well as a second modulation type and configuration that differs from the first modulation type and configuration. Consequently, any node may be used to implement an interface between telemetry networks.

In these embodiments, the nodes located in the first section 20 of the pipe string may be selectively programmed to transmit signals at the first modulation frequency and/or using the first modulation type and configuration. The nodes located in the second section 22 may be selectively programmed to transmit signals at the second modulation frequency and/or using the second modulation type and configuration. Consequently, the boundary between the first telemetry network and the second telemetry network may be reconfigured on-demand, for example as characteristics the environment of the nodes changes as the pipe string moves in the well 10.

While the embodiment shown in FIG. 1 has been described for a telemetry network that communicates digital data from downhole locations to the surface, in other embodiments, the first telemetry network and the second telemetry network may be further configured to communicate digital data bi-directionally between downhole locations and the surface. In such cases, the interface apparatus may be coupled to a pair of receivers, one of the pair of receivers being configured to sense acoustic signals from the first telemetry network, and the other of the pair of receivers being configured to sense acoustic signals from the second telemetry network. The interface apparatus may also be coupled to a pair of transmitters, one of the pair of transmitters being configured to emit acoustic signals to the first telemetry network, and the other of the pair of transmitters being configured to emit acoustic signals to the second telemetry network. In some cases, a single transmitter or receiver may be used to communicate digital data bi-directionally. In such cases, the single transmitter and receiver are capable of handling both modulated signals.

In yet other embodiments, a third telemetry network may be inserted between the first telemetry network and the second telemetry network. In such embodiments, the third telemetry network may be implemented as part of the interface apparatus 24. The third telemetry network may rely on the propagation of the third modulated signal, which may be, for example, an electromagnetic signal traveling in a formation surrounding the well 10.

Figure 2:
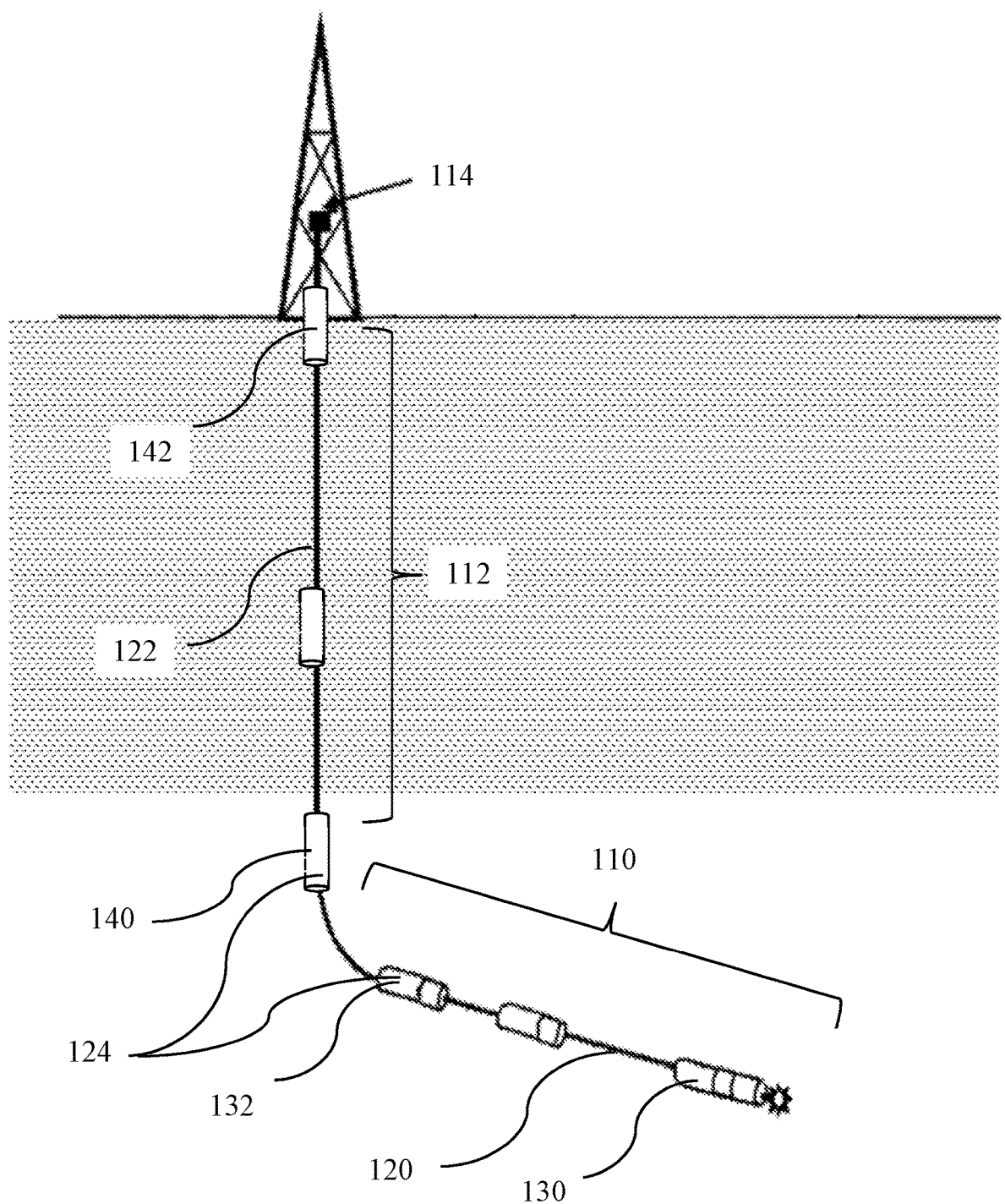
FIG. 2 is a schematic of a telemetry system including a first telemetry network located in a deviated portion of the well, and a second telemetry network located in a vertical portion of the well, wherein the first telemetry network is not based on a pipe string vibration signal traveling in the pipe string wall, and wherein the second telemetry network is based on a pipe string vibration signal traveling in the pipe string wall.

Turning to FIG. 2, a pipe string (120, 122) including a first section 120 of the pipe string and a second section 122 of the pipe string is illustrated. The second section 122 is adjoining the first section 120. The first section 120 of the pipe string may be located in a first portion 110 of the well that is horizontal or highly deviated, and/or open-hole. The second section 122 of the pipe string may be located in a second portion 112 of the well that is vertical and/or cased. The second portion 112 of the well may extend to a drilling rig 114 to which the pipe string (120, 122) is suspended. The drilling rig 114 may be onshore or offshore.

A first telemetry network is provided in the first section 120 of the pipe string. The first telemetry network comprises at least one first transmitter 130 capable of emitting a first modulated signal encoding digital data and at least one first receiver 132 capable of sensing the first modulated signal. For communicating digital data along a pipe string, the first telemetry network relies on the propagation of the first modulated signal, which, in the embodiment of FIG. 2, is not an acoustic signal traveling in a wall of the first section 120 of the pipe string.

For example, the first modulated signal may be a mud-pulse telemetry signal traveling in a fluid located in a bore of the first section 120 of the pipe string. Such a mud-pulse telemetry network may be preferred over an acoustic signal traveling in the wall of the first section 120 of the pipe string in cases where the first portion 110 of the well is extended, and either horizontal or highly deviated. In such cases, acoustic signals may attenuate too strongly because of the contact between the first section 120 of the pipe string and the wall of the well. Instead, mud-pulse telemetry signals may propagate more efficiently.

Alternatively, the first modulated signal may be an electromagnetic signal traveling in a formation surrounding the first portion 110 of the well. An electromagnetic telemetry network may provide the same benefits as a mud-pulse telemetry network, especially because horizontal or highly deviated portions of a well are usually located in hydrocarbon-bearing reservoirs that are not conductive and therefore, in which electromagnetic signals travel without excessive attenuation.

As such, the first modulated signal may be selected based on its attenuation relative to an acoustic signal. In addition to this selection criterion, the first modulated signal may be selected based on its convenience for interfacing with a telemetry network that relies on acoustic signals. For example, a mud-pulse telemetry signal can readily be picked up by a pressure sensor integrated into a node of an acoustic telemetry network, thus permitting the use of a standard node of an acoustic telemetry system for implementing an interface apparatus in the telemetry network that relies on acoustic signals.

A second telemetry network is provided in the second section 122 of the pipe string. The second telemetry network comprises at least one second transmitter 140 capable of emitting a second modulated signal encoding digital data and at least one second receiver 142 capable of sensing the second modulated signal. For communicating digital data along the pipe string, the second telemetry network relies on the propagation of the second modulated signal, which, in contrast to the first telemetry network shown in the embodiment of FIG. 2, is an acoustic signal traveling in a wall of the second section 122 of the pipe string. For example, the second transmitter 140 and/or the second receiver 142 may be acoustic transceivers of an inline type, such as disclosed in Canadian Patent Application Pub. No. 2,585,046. Such an acoustic telemetry network may be preferred over a mud-pulse telemetry network in the second section 122 of the pipe string, which is the proximal section, because acoustic telemetry networks are less affected by the noise generated by the mud pumps operating on the drilling rig 114. Such an acoustic telemetry network may also be preferred over an electromagnetic telemetry network in the second section 122 of the pipe string, because this section of the pipe string may be in a portion of the well surrounded by conductive formations or ocean water that greatly attenuate electromagnetic signals. Also, this portion of the well may be cased, and the casing can contribute to the attenuation of and/or interfere with electromagnetic signals.

An interface apparatus 124 is provided in communication with the first receiver 132 and the second transmitter 140. In the example shown, some of the components of the interface apparatus 124 may be collocated with the first receiver 132, and other components of the interface apparatus 124 may be collocated with the second transmitter 140. The components of the interface apparatus 124 may communicate via wires or optic fibers as explained in the description of FIG. 3. The interface apparatus 124 may be capable of decoding the first modulated signal to generate digital data, and encode at least a portion the generated digital data into the second modulated signal. However, decoding by the interface apparatus 124 is not required, as explained again in the description of FIG. 3.

The first telemetry network, the second telemetry network, and the interface apparatus 124 form a telemetry system for communicating digital data along the pipe string (120, 122) to and/or from the drilling rig 114.

While the embodiment shown in FIG. 2 has been described for a telemetry network that communicates digital data from downhole locations to the surface, in other embodiments, the first telemetry network and the second telemetry network may be further configured to communicate digital data bi-directionally between downhole locations and the surface. In such cases, the interface apparatus may be coupled to a pair of receivers, one of the pair of receivers being configured to sense non-acoustic signals from the first telemetry network, and the other of the pair of receivers being configured to sense acoustic signals from the second telemetry network. The interface apparatus may also be coupled to a pair of transmitters, one of the pair of transmitters being configured to emit non-acoustic signals to the first telemetry network, and the other of the pair of transmitters being configured to emit acoustic signals to the second telemetry network.

In yet other embodiments, a third telemetry network may be inserted between the first telemetry network and the second telemetry network. In such embodiments, the third telemetry network may be implemented as part of the interface apparatus 124. The third telemetry network may rely on the propagation of the third modulated signal, which may be, for example, an electromagnetic signal traveling in a formation surrounding the well 10.

Figure 3:
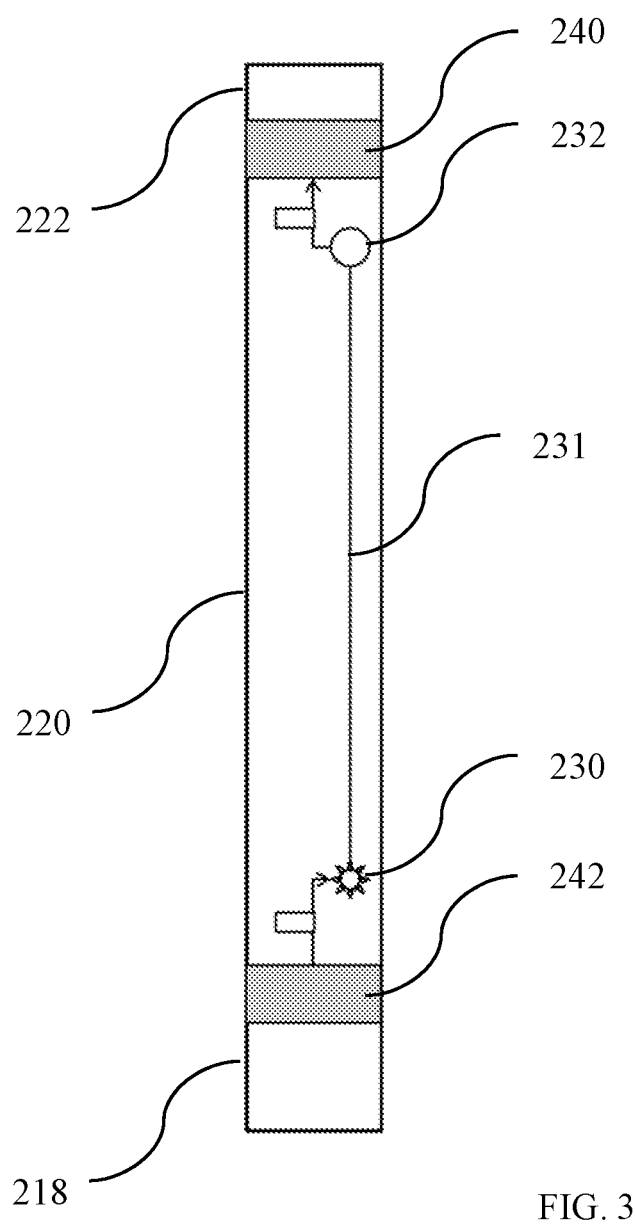
FIG. 3 is a schematic of a telemetry system for communicating a modulated signal representing digital data and including a central telemetry network that is based on optical signal propagation, and that is coupling two peripheral telemetry networks that are not based on optical signal propagation, wherein the optical signal is transmitted through an optic fiber without decoding the modulated signal into the digital data.

Turning to FIG. 3, a portion of a pipe string (218, 220, 222) includes a central, first section 220, a peripheral, second section 222 adjoining the first section 220, and a peripheral, third section 218 adjoining the first section 220 on the opposite side of the second section 222.

A first telemetry network that relies on the propagation of an optical signal is provided in the first, central section 220 of the pipe string. The first telemetry network comprises a first transmitter 230 capable of emitting a first modulated signal encoding digital data, wherein the first modulated signal is an optical signal, a first receiver 232 capable of sensing the first modulated signal emitted by the first transmitter 230, and one or more optic fiber 231 disposed along the first section 220 of the pipe string, and capable of transmitting the first modulated signal.

The first telemetry network may be used, for example, to communicatively couple together a second telemetry network provided in the second section 222 and a third telemetry network provided in the third section 218. In the embodiment of FIG. 3, neither the second telemetry network nor the third telemetry network is an optical telemetry network. For example, the second telemetry network, and/or the third telemetry network may rely on the propagation of modulated signals that may be any of a mud-pulse telemetry signal traveling in a bore of the pipe string, an electromagnetic signal traveling in a formation surrounding the well, or an acoustic signal traveling in a wall of the pipe string. Also, in the embodiment of FIG. 3, digital data encoded in modulated signals may be communicated along the pipe string (218, 220, 222) without decoding any of the modulated signals into the digital data. The embodiment of FIG. 3 may thus be used as a highly simplified interface apparatus. Alternatively, the embodiment of FIG. 3 may be used for extending the distance of communication of a modulated signal with little exposure to noise (e.g., acoustic noise, electromagnetic noise), and/or for locating digital processors remotely from analog sensors.

A second receiver 242 capable of sensing a mud-pulse telemetry signal and/or an acoustic signal may be implemented, for example, with a piezoelectric element (e.g., an accelerometer or a pressure sensor) that produces an electric analog signal related to the sensed signal. This electric analog signal may be conditioned with analog electronics and directly fed to the first transmitter 230, which may be implemented as a light emitting diode. Similarly, the first receiver 232 may be implemented, for example, with a photo-electric sensor that produces an electric analog signal related to the sensed optical signal. That electric analog signal may be conditioned with analog electronics and directly fed to a piezoelectric element implementing the second transmitter 240. Thus, digital data that has been encoded into a modulated mud-pulse telemetry or acoustic telemetry signal may be sensed by the second receiver 242. The digital data so encoded may be transmitted through the one or more optic fiber 231 as an optical signal related to the modulated signal sensed by the second receiver 242, without decoding the modulated mud-pulse telemetry or acoustic telemetry signal into the digital data. And the digital data so encoded may further be emitted by the second transmitter 240 as a modulated mud-pulse telemetry or acoustic telemetry signal, again without decoding the optical telemetry signal into the digital data.

In other embodiments, the optical telemetry data may be decoded to generate the digital data for processing, for example at a drilling rig (not shown in FIG. 3). Further, the piezoelectric elements implementing the second receiver 242 and/or the second transmitter 240 may be replaced by electromagnetic coils coupled to suitable analog electronics for driving coils, so that an electromagnetic telemetry system may be communicatively coupled to another electromagnetic telemetry system through the optical telemetry network similar to the one shown in FIG. 3, without decoding/re-encoding any modulated signal into digital data. Still further, other combinations of telemetry networks may be communicatively coupled through an optical telemetry network.

While the disclosure is susceptible to various modifications and alternative forms, specific embodiments thereof are shown by way of example in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. A method of communicating digital data along a pipe string for use in a well, the pipe string including a first section and a second section adjoining the first section, the method of communicating digital data comprising:
providing a first transmitter and a first receiver in the first section of the pipe string;
providing a second transmitter located in the second section of the pipe string;
wherein the first section of pipe string and the second section of the pipe string differ by one or more of their pipe diameters, average lengths of the pipe joints, weights of the pipe joints, thicknesses of the pipe string, types of connections between pipe joints, and base geometries of the pipe string;
providing an interface apparatus in communication with the first receiver and the second transmitter;
emitting, with the first transmitter, a first modulated signal encoding the digital data,
wherein the first modulated signal is a first acoustic signal traveling in a wall of the first section of the pipe string;
sensing, with the first receiver, the first modulated signal;
decoding, with the interface apparatus, the first modulated signal to generate the digital data;
emitting, with the second transmitter, a second modulated signal encoding at least a portion of the digital data, wherein the second modulated signal is a second acoustic signal traveling in a wall of the second section of the pipe string,
wherein a first configuration of the first modulated signal differs from a second configuration of the second modulated signal,
wherein the first and second configurations pertain to a specification for one or more of attributes of the first and second modulated signals, respectively, the attributes being selected from the list consisting of frequency bandwidth, center frequency, a modulation type and configuration, and error correction coding,
wherein the first transmitter is one of a clamp-on transmitter attached to the first section of the pipe string and a carrier-based transmitter incorporated into a receptacle in the wall of the first section of the pipe string,
wherein the first receiver is one of a clamp-on receiver attached to the first section of the pipe string, an inline receiver forming a portion of the first section of the pipe string, and a carrier-based receiver incorporated into a receptacle in the wall of the first section of the pipe string, and
wherein the second transmitter is an inline transmitter forming a portion of the second section of the pipe string,
wherein the first configuration is based on one or more characteristics of propagation of the first section of pipe, and the second configuration is based on one or more characteristics of propagation of the second section of pipe.

2. The method of claim 1, wherein the interface apparatus, the first receiver, and the second transmitter are collocated in a single tool.

3. The method of claim 1, further comprising:
providing a third transmitter and a second receiver in the second section of the pipe string;
providing a fourth transmitter located in the first section of the pipe string;
providing the interface apparatus in communication with the second receiver and the fourth transmitter;
communicating digital data bi-directionally between the first section and the second section.

4. The method of claim 1, further comprising:
communicating digital data bi-directionally between the first section and the second section using the first receiver, the second transmitter, and the interface apparatus.

5. The method of claim 1, wherein a second modulation frequency of the second modulated signal is higher than a first modulation frequency of the first modulated signal, and wherein a data rate of the first modulated signal is approximately equal to a data rate of the second modulated signal.

6. The method of claim 1, wherein a second modulation frequency of the second modulated signal is lower than a first modulation frequency of the first modulated signal, and wherein a data rate of the first modulated signal is approximately equal to a data rate of the second modulated signal.

7. The method of claim 1, wherein encoding overhead is compensated with large bandwidth signals, and constrained bandwidth is compensated with a low error correction.

8. The method of claim 1, wherein the first configuration is further based on pipe string configuration, well configuration, and well environment in the first section, and the second configuration is further based on pipe string configuration, well configuration, and well environment in the second section.

9. The method of claim 1, further comprising:
measuring a first passband of the first acoustic signal; and
determining a first modulation frequency of the first modulated signal based on the first passband.

10. The method of claim 1, further comprising:
providing a second receiver in the second section of the pipe string;
measuring a noise spectrum of a noise signal sensed with the second receiver when the second transmitter is not emitting;
measuring a passband spectrum of a signal traveling between the second transmitter and the second receiver; and
determining the second configuration based on the noise spectrum and the passband spectrum.

* * * * *